United States Patent
Doshi et al.

(10) Patent No.: US 10,528,470 B1
(45) Date of Patent: Jan. 7, 2020

(54) SYSTEM, APPARATUS AND METHOD TO SUPPRESS REDUNDANT STORE OPERATIONS IN A PROCESSOR

(71) Applicant: Intel Corporation, Santa Clara, CA (US)

(72) Inventors: Kshitij Doshi, Tempe, AZ (US); Bhanu Shankar, Pleasanton, CA (US)

(73) Assignee: Intel Corporation, Santa Clara, TX (US)

( * ) Notice: Subject to any disclaimer, the term of this patent is extended or adjusted under 35 U.S.C. 154(b) by 17 days.

(21) Appl. No.: 16/006,956

(22) Filed: Jun. 13, 2018

(51) Int. Cl.
*G06F 12/00* (2006.01)
*G06F 12/0804* (2016.01)
*G06F 3/06* (2006.01)

(52) U.S. Cl.
CPC ........ *G06F 12/0804* (2013.01); *G06F 3/0613* (2013.01); *G06F 3/0656* (2013.01); *G06F 3/0673* (2013.01); *G06F 2212/1016* (2013.01)

(58) Field of Classification Search
None
See application file for complete search history.

(56) References Cited

U.S. PATENT DOCUMENTS

| 2004/0186862 | A1* | 9/2004 | Garthwaite | G06F 12/0276 |
| 2009/0052227 | A1* | 2/2009 | Edahiro | G11C 13/0007 365/148 |
| 2009/0190404 | A1* | 7/2009 | Roohparvar | G11C 15/046 365/185.17 |
| 2009/0210633 | A1* | 8/2009 | Kundinger | G06F 12/0833 711/141 |
| 2011/0157990 | A1* | 6/2011 | Toyama | G11C 16/04 365/185.17 |
| 2012/0254507 | A1* | 10/2012 | Chang | G06F 12/0868 711/103 |
| 2016/0179403 | A1* | 6/2016 | Kurotsuchi | G06F 3/0617 711/114 |
| 2016/0321185 | A1 | 11/2016 | Doshi et al. | |
| 2017/0097782 | A1* | 4/2017 | Ramalingam | G06F 3/0616 |

OTHER PUBLICATIONS

U.S. Appl. No. 16/015,517, filed Jun. 22, 2018, entitled, "Nonvolatile Memory Store Suppression", by Kshitij Doshi, et al.
Kevin M. Lepak, et al., "On the Value Locality of Store Instructions," Published in the Proceedings of the 27th Annual International Symposium on Computer Architecture, Jun. 12-14, 2000, 10 pages.

\* cited by examiner

*Primary Examiner* — John A Lane
(74) *Attorney, Agent, or Firm* — Trop, Pruner & Hu, P.C.

(57) ABSTRACT

In one embodiment, a processor has a core including at least one execution circuit, a retirement circuit, a first cache memory, and a first cache controller to control the first cache memory, where the first cache controller, in response to a store request to store a first value to a memory coupled to the processor, is to suppress the store operation when the first value matches a stored value of a cache line associated with the store operation. Other embodiments are described and claimed.

20 Claims, 14 Drawing Sheets

SYSTEM, APPARATUS AND METHOD TO SUPPRESS REDUNDANT STORE OPERATIONS IN A PROCESSOR

TECHNICAL FIELD

Embodiments pertain to processor interaction with a memory.

BACKGROUND

In computing systems, oftentimes a processor obtains data from a memory and writes the data back to the memory with an unchanged value. That is, some percentage of store operations write a value to a destination memory location that is not different from the value stored in the memory location. These store operations are termed "silent stores." Such a silent store may occur due to idiomatic behaviors such as reinitializing buffers with static patterns, setting or clearing flags through cascaded switch statements, writing zero (or one) multiple times to the same item because of cascaded condition evaluations, adding/subtracting zero or multiplying by one, as examples. Such unnecessary store operations can have negative impacts on performance, power, and for at least certain memory types, endurance of the memory.

DETAILED DESCRIPTION

Figure 1:
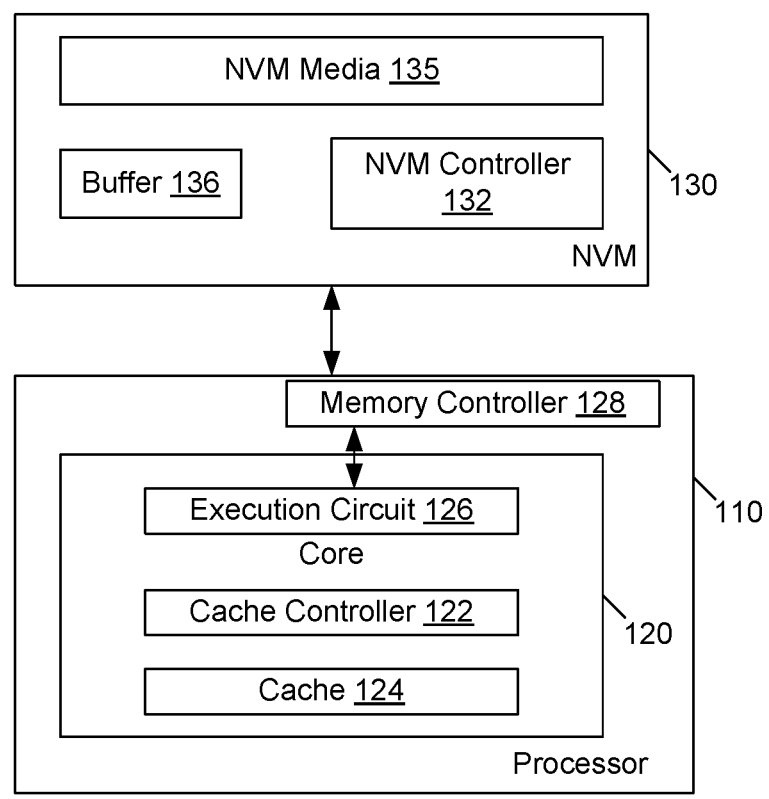
FIG. 1 is a block diagram of a system in accordance with an embodiment.

In various embodiments, a processor may be configured to detect silent store operations. Such silent store operations occur when a value to be written to a storage location is already stored in the storage location. To this end, embodiments provide hardware circuitry within a processor to identify when a value to be written matches an already-stored value. Furthermore, techniques are provided, in response to this detection, to prevent the store or write operation from occurring. Such store suppression is performed in a manner that maintains correct processor operation. In this way, improved performance and reduced power consumption are realized. Still further, negative aspects of write operations to particular memory structures such as non-volatile memory structures may be avoided, enabling longer reliability of such memory devices.

While example embodiments are described in the context of non-volatile memory (NVM)-homed cache lines, embodiments are applicable to both volatile and non-volatile memories. For non-volatile memories, the techniques described herein may increase the lifetime of NVM devices such as non-volatile dual inline memory modules (NVDIMMs). Such benefits are especially realized as processor operation typically does not take into account the differing characteristics of the memory technologies, including: (i) cache-line addressable dynamic random access memory (DRAM) and block-line addressable non-volatile RAM (NVRAM); (ii) differences in latency and throughput of the two devices for both read and write operations; and (iii) media management in NVRAM, including wear leveling.

Embodiments enable reduced memory traffic with lower overhead than hardware-based techniques such as on-the-fly memory deduplication (which may interfere with high speed paths) and compiler-based (or binary retranslation-based) removal of silent stores, which also add overhead and may impact correctness.

With suppression of store operations as described herein, reduced memory traffic is realized, along with coincidental load lightening on the NVM. Such suppression of store operations reduces the impact of write operations to the NVM that incur a heavy weight impact on the memory module in terms of performance, media endurance, and energy. This is so, since for any cache line that is written back, a fairly heavy read-modify-write protocol is followed, which causes more than a single cache line to be written, and further causes changes to adjacent locations in the NVM due to granularity differences between processor caches and NVM media blocks.

Referring now to Table 1, shown is an example of pseudo-code for a store suppression operation in accordance with an embodiment.

TABLE 1

```
Processor takes ownership of cache line
If (home of X is NVM && X == value) {
    No-operation;
} else {
    X = value
    Cache line marked as dirty
}
```

As shown in Table 1, when the write operation "X=value" is seen by hardware, where X is a memory location in a NVM device, hardware checks to determine when the value being written is the same as the existing value, and if so, avoids performing the store in that case.

Referring now to FIG. 1, shown is a block diagram of a system in accordance with an embodiment. As shown in FIG. 1, a system 100 may be any type of computing device, ranging from a small portable electronic device such as a smartphone or tablet computer to a larger computing device such as a laptop computer, desktop computer, server computer or so forth. In the high level shown in FIG. 1, system 100 includes a processor 110 and a memory 130. For purposes of discussion, assume that memory 130 is a non-volatile memory (NVM). Different types of non-volatile memories, including non-volatile semiconductor memories such as a flash memory or phase change memory or other memory types such as an optical memory may be present. Other examples of NVM technologies include resistive random access memory (Re-RAM), magnetoresistive RAM (MRAM), memristor technology, NAND flash and NOR flash.

As illustrated in FIG. 1, processor 100 includes a core 120, and a memory controller 128 that provides an interface between processor 120 and memory 130. Although only a single core is shown for ease of illustration, understand that in many implementations processor 110 may be a multicore processor. In the high level shown in FIG. 1, core 120 includes a cache controller 122, a cache memory 124, and execution circuitry 126. Understand while a single cache memory 124 is shown for ease of illustration, in many implementations multiple core-included cache memories may be present, including separate instruction and data cache memories. In one embodiment, multiple levels of cache memories, including a Level 1 (L1) and a Level 2 (L2) cache memory may be present. For ease of discussion however, operation herein will be described in the context of a single core-included cache memory.

Cache controller 122 may be configured to control operation of cache memory 124, including cache insertions, cache evictions, cache flushes, and maintaining cache coherency state. In addition as described herein, cache controller 124 in connection with execution circuitry 126 may be configured to reduce and/or suppress redundant writes to memory 130.

Non-volatile memory 130 includes an NVM controller 132, a buffer 136, and one or more NVM media 135. NVM controller 132 may control operation of memory 130, including performing read and write operations, wear leveling operations and so forth. To this end, NVM controller 132 may cause requested data blocks to be provided to processor 110 via buffer 136, and similarly enable incoming cache lines received from processor 110 to be stored into NVM media 135 also via buffer 136. NVM controller 132 also may perform wear leveling operations in which blocks of data stored in a particular location within NVM media 135 are stored into buffer 136, combined with new incoming data, and then stored to a different location within NVM media 135. Understand while shown at this high level in the embodiment of FIG. 1, many variations and alternatives are possible.

Figure 2:
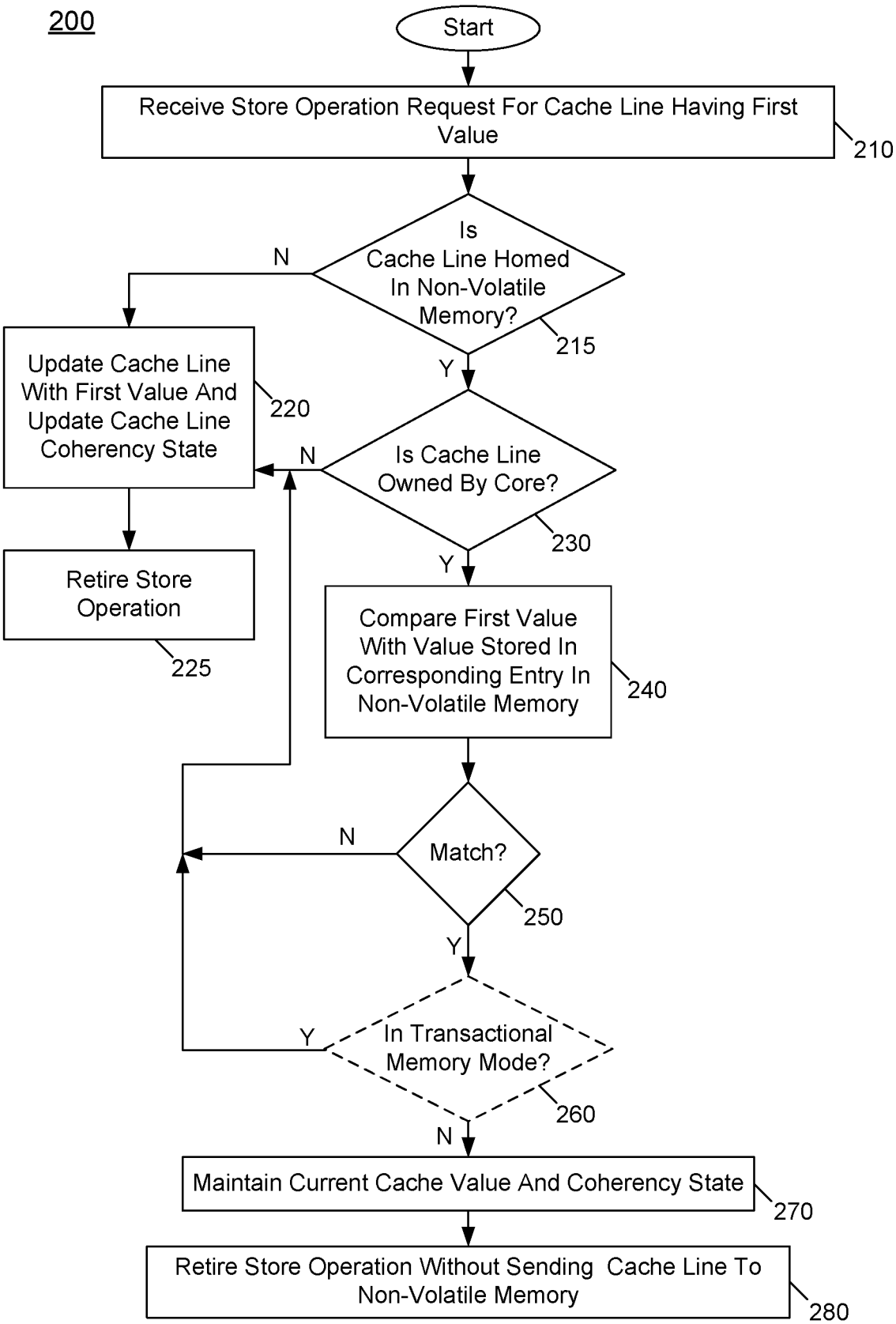
FIG. 2 is a flow diagram of a method in accordance with an embodiment of the present invention.

Referring now to FIG. 2, shown is a flow diagram of a method in accordance with an embodiment of the present invention. As shown in FIG. 2, method 200 is a method for processing store operations in a processor in accordance with an embodiment. As such, method 200 may be performed by hardware circuitry, firmware, software and/or combinations thereof. In a particular embodiment, method 200 may be performed by various hardware circuitry of a processor, including a cache controller and additional core circuitry.

As illustrated, method 200 begins by receiving a store operation request in the core (block 210). More specifically this store operation request is to write a cache line back to a processor-external memory. Such store operation request may be in response to a given type of write instruction, which can take many different types of forms in different embodiments. Next it is determined whether the cache line is homed in a non-volatile memory (diamond 215). As used herein, the term "home" refers to a final destination location for an associated memory operation. Depending upon a given system configuration such home location may be a volatile memory or a non-volatile memory. Although the scope of the present invention is not limited in this regard, this determination of the home location for the cache line may be made with reference to system address decoder circuitry of the processor. In one particular embodiment, the home location determination may be made based at least in part on so-called PRE bits of a memory address associated with a store request. These PRE bits identify the physical memory as located (or homed) in DRAM or in NVM. As such, based at least in part on a portion of an address associated with the store operation request, e.g., a physical address, the processor may identify whether the destination of this store operation is a non-volatile memory or a volatile memory (e.g., a dynamic random access memory (DRAM)).

If it is determined that the cache line is not homed in a non-volatile memory, control passes to block 220. At block 220 the cache line within a given cache memory (e.g., a L1 data cache) may be updated. That is, this first value may be stored in the cache line and furthermore a cache coherency state of this cache line may be updated. In an example implementation, a cache coherency protocol may provide for multiple different coherency states such as a so-called MESIF cache coherency protocol, referring to the states of modified, exclusive, shared, invalid and forward states. In one embodiment this write operation to write the first value may cause the cache coherency state to be change to a modified (M) state. Note further with regard to the discussion at block 220 that the data at this point is not necessarily written back to the destination memory. Instead, based on normal cache operation, at some point the cache line will be written back to the memory, e.g., in response to an eviction or cache flush instruction. Nevertheless, after the update to the cache line and the coherency state update, control passes to block 225 where the store operation is retired. That is, at this point the instruction for the store operation (e.g., a given write instruction) may be retired, as the write instruction has been committed to the processor state. Understand that these operations at blocks 220 and 225 may occur conventionally, as these are the typical operations performed to cause a write of data to a given destination memory.

Still referring to FIG. 2, instead if it is determined at diamond 215 that the cache line is homed in a NVM, control passes to diamond 230 to determine whether the cache line is owned by the core. In an embodiment this determination may be based on presence of the cache line in a core cache in a shared, exclusive or modified state. If it is determined that the cache line is not owned by the core, control passes to block 220, discussed above.

Still with reference to FIG. 2 if the cache line is determined to be owned by the core, control passes to block 240 where the first value can be compared with the value stored in the corresponding location in the non-volatile memory. Note that in the typical situation here, as this cache line is owned by the core, it is present in the core-included cache, such that this comparison may be made by execution circuitry within the core with low latency, and without the need for any memory access to a core-external memory. However, understand that in some implementations it may be feasible to perform such compare operations by obtaining the stored value from another processor-included cache memory, such as a shared cache memory.

Based on this comparison, it is determined at diamond 250 whether the values match. If not, control passes to block 220, discussed above to perform the store operation as a silent store situation has not been detected. Instead if it is determined that the values match, this is an indication of a silent store detection. As such, with further reference to FIG. 2, an optional determination may be made at diamond 260 to determine whether the processor is operating in a transactional memory mode. In such an optional embodiment, a performant-efficient store suppression may not be performed during transaction execution to ensure consistency between data that may be accessed by multiple transactions. That is, this optional detection may exclude transactional write operations from this protocol since non-modifying speculative write operations in a transactional memory region may still generate various coherence interactions for transactional correctness. Thus to avoid complexity, such transactional write operations may be excluded from store suppression. However in other embodiments it is still possible to allow the store suppression to occur even in a transactional memory mode, as long as proper prerequisites are met.

Still with reference to FIG. 2, control passes from diamond 260 to block 270 where the current cache value and coherency state are maintained within the cache memory. This is the case, as based on the determination of matching values, there would be no change to the information stored in the cache line. As such, on a determination of matching values, a store suppression operation occurs. To this end, control next passes to block 280 where the store operation may be retired. More specifically in this instance of store suppression, the store operation is retired without sending the cache line to the non-volatile memory. Understand of course that as discussed above, the currently stored value eventually may be written back to the non-volatile memory. However, such writeback occurs, e.g., according to an eviction, flush operation or so forth. With embodiments herein, for the common case of a non-speculative store operation, core cache resident cache lines are only modified if a store operation actually changes the contents of the NVM-homed cache line. Understand while shown at this high level in the embodiment of FIG. 2, many variations and alternatives are possible. For example, while the techniques described herein are not limited to NVM-homed cache lines, one reason for such limitation is to reduce latency in bringing the reference data into a processor scratchpad for comparison, and also because non-NVM cache lines are likely to absorb more stores due to the reduced need for writing or evicting thereon. As such any benefit of generalizing the application of this technique from NVM-homed cache lines to all cache lines in a core cache may be muted in any case.

Figure 3:
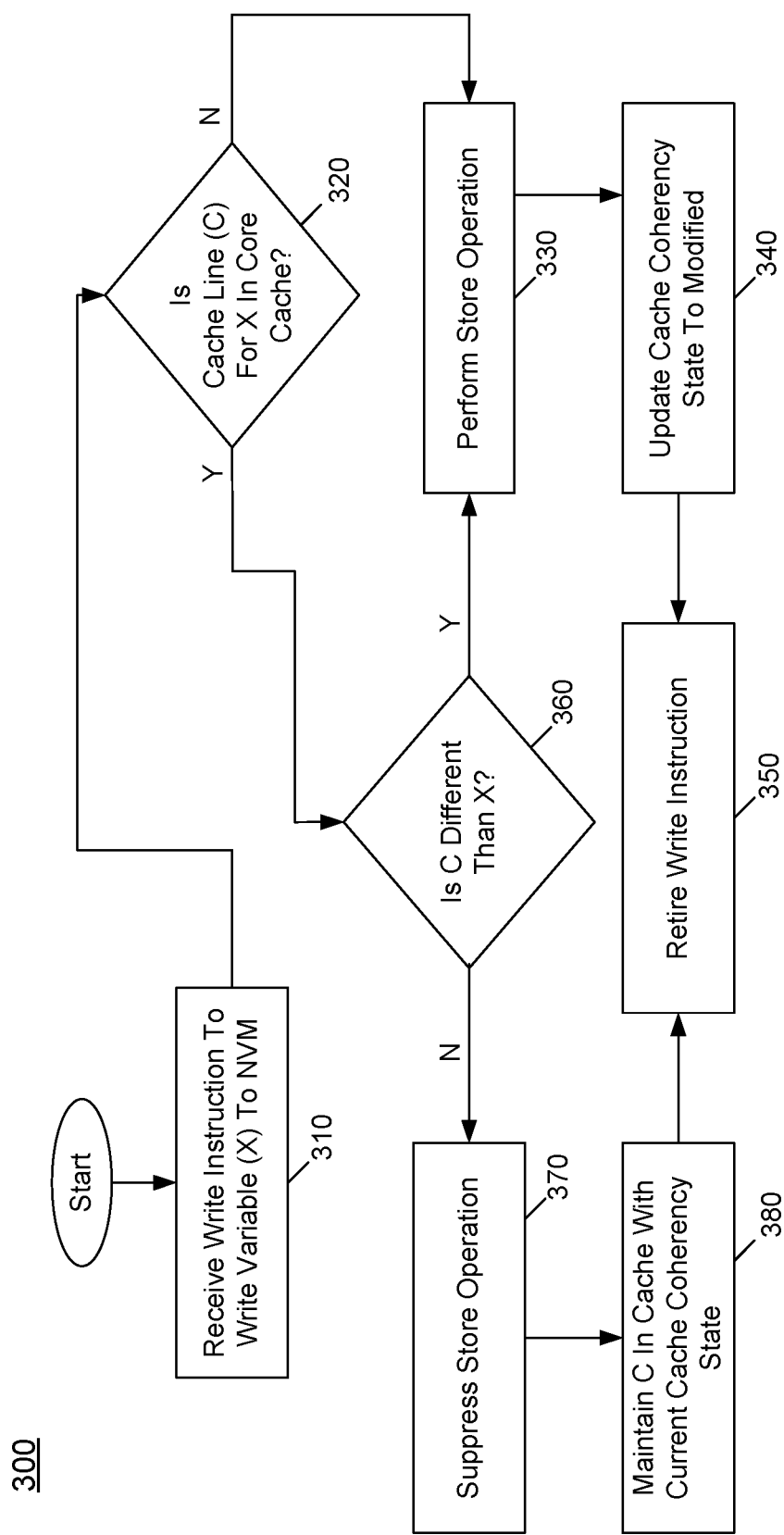
FIG. 3 is a flow diagram of a method in accordance with another embodiment of the present invention.

Referring now to FIG. 3, shown is a flow diagram of a method in accordance with another embodiment of the present invention. More specifically method 300 shown in FIG. 3 is another embodiment for suppressing a store operation for a received write instruction. As such, method 300 may be performed by hardware circuitry, firmware, software and/or combinations thereof. In a particular embodiment, method 300 may be performed by various hardware circuitry of a processor, including a cache controller and additional core circuitry.

As illustrated in FIG. 3, method 300 begins by receiving a write instruction to write a given value (e.g., a variable) X to a non-volatile memory (block 310). This write instruction may be a user-level instruction or it may be an internal write instruction. In any event, as the destination of this write instruction is a NVM (e.g., as indicated in the write instruction itself or determined based on an address of the memory location), control next passes to diamond 320. At diamond 320 a cache controller may determine whether a cache line for this variable X is present in a core cache. This determination may be based upon a lookup operation using at least a portion of the address of the write instruction. Although this determination at diamond 320 is performed in order to optimize performance and reduce latency by avoiding accesses outside of the core, understand the scope of the present invention is not limited in this regard. In other cases, core-external storages also may be accessed to determine whether there is a stored value for a cache line corresponding to the address of the destination location.

If it is determined at diamond 320 that the cache line is not present in the core cache, control passes to block 330 where a store operation may be performed to the cache memory. As such, store suppression is not indicated and as a result, the variable X is written into the given cache line in the core cache. Still further, as also illustrated in FIG. 3 at block 340, the cache coherency state of this cache line may be updated. More specifically, by way of a write insertion to this core cache, the cache coherency state is updated to a modified state. Thereafter, control passes to block 350 where the write instruction is retired. In embodiment, a retirement circuit of the core may retire the instruction. Note that such retirement does not necessarily mean that the value written into the cache line has already been written back to the non-volatile memory, as discussed above.

Still with reference to FIG. 3, instead if it is determined at diamond 320 that the cache line including the variable is present in the core cache, control passes next to diamond 360 to determine whether the previous (stored) value of the variable X is different from the new value. Note that in an embodiment, the comparison is based on the width of the data type being written (X), which is typically smaller then the size of the cache line (C). The portion of the cache line that is unaffected by the operational width is not used in the comparison or otherwise modified. If it is determined that the variable X and the stored value differ (as determined at diamond 360), control passes to block 330, discussed above where a store operation proceeds.

Still with reference to FIG. 3, if the values are not different, control passes to block 370 where the store operation may be suppressed. This suppression of the store operation may be implemented as a non-performing store (e.g., a no operation (NOP)) in which the variable X of the write instruction is not written into the cache memory, and thus may be ignored or discarded. Instead, as further illustrated in FIG. 3, at block 380 the previous value of the cache line is maintained in the cache line, along with its current cache coherency state (which may be any of, e.g., modified, exclusive or shared states as examples). From block 380 control passes next to block 350 where the write instruction retires. That is, even though no store operation is actually performed to the cache line (as the value to be written is the same as the stored value), the non-performing store operation still retires to ensure proper machine state.

Understand while shown at this high level in the embodiment of FIG. 3, many variations and alternatives are possible. For example, note that in an alternate embodiment store suppression may be prevented and the store operation may be performed if the cache line was in the modified state. In such cases, a determination may be made, prior to the determination at diamond 360, whether the stored cache line is in the modified state, in if so, to pass control to block 330, to enable the store operation to occur. With this alternate embodiment, unnecessary coherency state transitions (E/S to M) may be avoided for NVM-homed cache lines.

Figure 4:
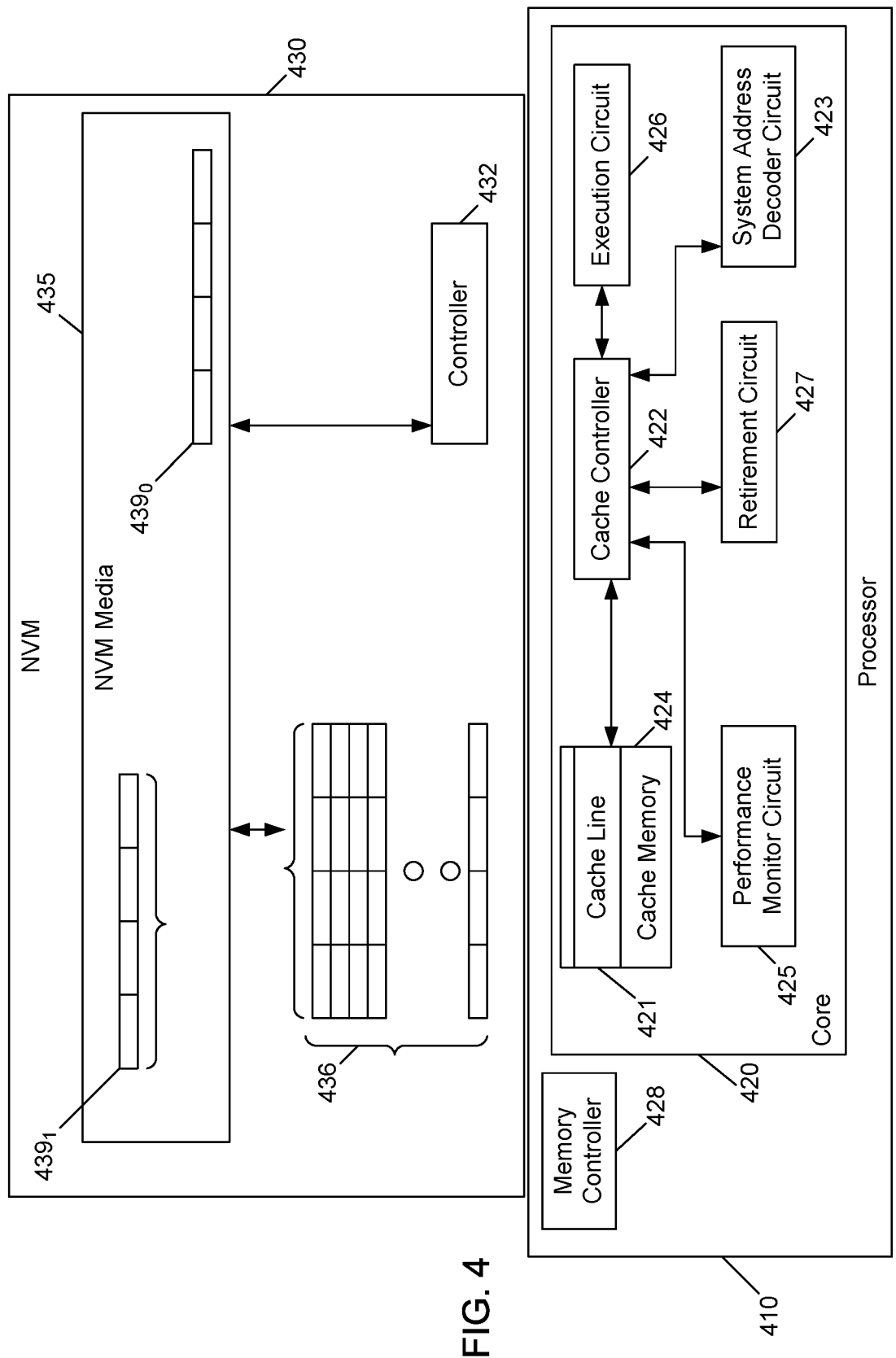
FIG. 4 is a block diagram of a system in accordance with another embodiment of the present invention.

Referring now to FIG. 4, shown is a block diagram of a system in accordance with another embodiment of the present invention. As shown in FIG. 4, a system 400 includes at a high level a processor 410 and a memory 430, namely a NVM. Processor 400 includes a core 420, and a memory controller 428 that provides an interface between processor 420 and memory 430. In the high level shown in FIG. 4, core 420 includes a cache controller 422, a cache memory 424, and an execution circuit 426. Cache controller 422 may be configured to control operation of cache memory 424, including performing store suppressions as described herein.

As further shown in FIG. 4, processor 410 further includes a system address decoder circuit 423, a performance monitor circuit 425 and a retirement circuit 427. In embodiments herein, system address decoder circuit 423 may be configured to receive address information, e.g., from cache controller 422, and determine whether the address is located in a destination memory that is a non-volatile memory (or not). In turn, system address decoder circuit 423 may send a result of its determination back to cache controller 422. As further shown, cache controller 422 also is in communication with retirement circuit 427. In embodiments herein, retirement circuit 427 may be configured to retire write instructions even in the instance that a store operation is suppressed as described herein.

Cache controller 422 further couples to a performance monitor circuit 425. In embodiments, performance monitor circuit 425 may be configured to monitor various metrics of processor operation, including instruction execution rate, cache miss statistics, among many other types of performance metrics. In addition as described herein in some cases, performance monitor circuit 425 may include one or more counters to maintain a count of suppressed store operations for a given process, application or so forth. In addition, the performance monitor may further maintain relative store suppression information (e.g., the number of store suppressions as a fraction of the total number of store operations). As a result, embodiments may identify code locations and data addresses that perform a large number of redundant stores in a given application. In embodiments, software optimization of store suppression may be realized by leveraging performance monitoring information.

A processor may be configured for a profiling mode to profile for non-NVM locations, so that software can reduce the amount of cache bandwidth consumed by needless coherence interactions. For example, the MESIF protocol determines when a cache line moves into the modified state; when a line is modified all other copies are invalidated, which consumes cache coherence traffic. After the cache line is invalidated, access to that line from a sibling results in a request for a copy, which results in additional cache traffic; the protocol calls for the line to be moved into a parent cache. All of these additional coherence interactions can be avoided by removing the causality as described herein, the silent store. In some cases, software optimization for applications and services having a high number of stores suppressed may be to fix the code. In embodiments, performance monitoring information may provide a user information about the code segment and the memory access patterns that causes the suppressed stores. Based on this data, a programmer may implement various software optimization techniques to either re-write the code, or re-structure data structures to reduce or eliminate suppressed stores. As examples, a programmer can deploy a myriad of data structural techniques such as: (i) structure splitting; (ii) switching between array-of-structures to structure-of-arrays, or vice versa; or (iii) changing field ordering, among others.

Still with reference to FIG. 4, further details of non-volatile memory 430 are illustrated. Non-volatile memory 430 includes an NVM controller 432, a buffer 436, and one or more NVM media 435. Specifically, the block-level arrangement of NVM 430 is illustrated. As shown in the embodiment of FIG. 4, information is stored in NVM media 435 in units of blocks. Two particular block units are shown, namely blocks $439_0$ and $439_1$. In the embodiment of FIG. 4, each block includes four cache line widths of data. As such, in an embodiment in which a cache line width is 64 bytes, a block width is 256 bytes. Thus as illustrated, when a given cache line (e.g., representative cache line 421) is written back to NVM 430, it is placed into a given block within buffer 436. Understand while shown at this high level in the embodiment of FIG. 4, many variations and alternatives are possible.

With store suppression as described herein, a cache line is not marked as dirty, which results in lower pressure on cache coherence checks and operations. As a result, the cache line can be shared between private caches without invalidation of prior information. Under normal operating environments, when the cache line is removed from the cache hierarchy either by replacement or by forcibly by a cache line flush or cache line writeback operation, a write operation will not be generated to the NVM device, assuming the cache line is in the E or S state. Further with embodiments, on a catastrophic system failure, the cache line will not have to be written back to memory using a mechanism such as an enhanced asynchronous DRAM refresh (EADR). Embodiments may further avoid a write-lockout problem in the NVM, in which a block in the NVM is locked from access until a write completion occurs.

Using an embodiment of the present invention, improved non-volatile memory performance is realized and power consumption may be reduced to maintain the state of memory. Further for a NVM destination, as each write of a cache line to the NVM causes adjacent lines to be written as well, eliminating writes eliminates the use of energy. As such, the total cost of operation/ownership is reduced. Embodiments may further increase perceived performance. That is, with the elimination of operations at the system level, there is a concomitant reduction in memory traffic from the memory controller, reducing queue depth of pending operations and increasing performance. Embodiments may further increase lifetime of the NVM device, as a NVM media has a rated number of write operations that can be performed on each and every location. By eliminating even a minute portion of write operations every day, the lifetime of the NVM device increases. For example, a common operation when memory is allocated, is to initialize it to a predetermined value of zero. When dealing with large memory allocations, operating systems have a concept of a zero page, which is utilized until the physical location is written. For such initialization operations, store suppression may avoid writes to memory.

As described above, a cache included within a processor or other SoC can be controlled to suppress silent stores, resulting in reduced memory impact. Such processor may include processor cores that may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 5A:
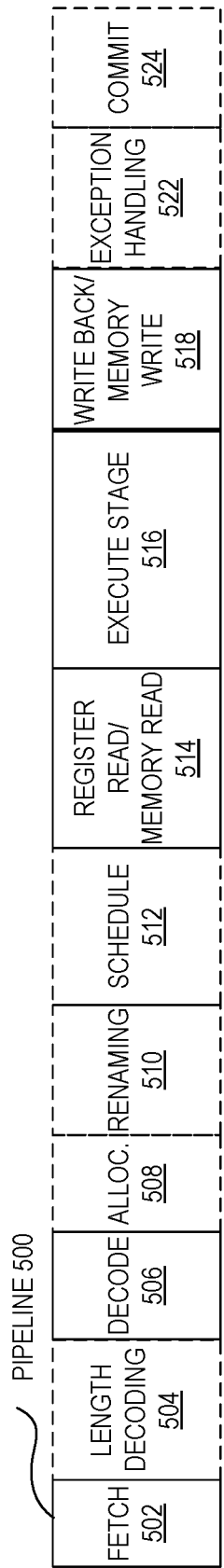
FIGS. 5A and 5B are block diagrams illustrating both an exemplary in-order pipeline and an exemplary register renaming, out-of-order issue/execution pipeline according to embodiments of the invention.
Figure 5B:
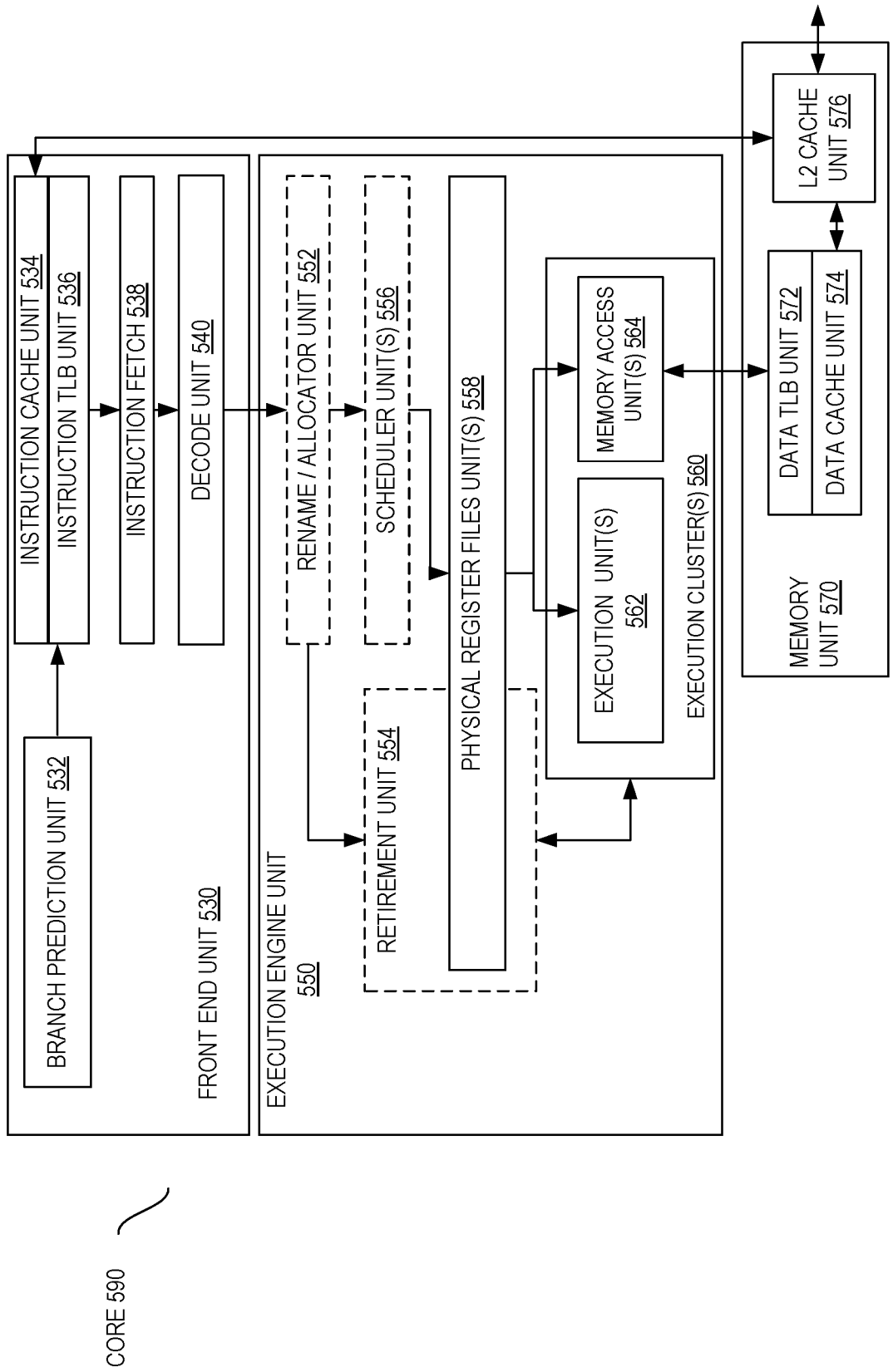

FIG. 5A is a block diagram illustrating both an exemplary in-order pipeline and an exemplary register renaming, out-of-order issue/execution pipeline according to embodiments of the invention. FIG. 5B is a block diagram illustrating both an exemplary embodiment of an in-order architecture core and an exemplary register renaming, out-of-order issue/execution architecture core to be included in a processor according to embodiments of the invention. The solid lined boxes in FIGS. 5A and 5B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534 (which in some embodiments may perform silent store suppression as described herein). And which is coupled to an instruction translation lookaside buffer (TLB) 536. The TLB 536 is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. One or more constituent memories of memory unit 570 may perform silent store suppressions.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor, any of which may perform silent store suppression as described herein. Alternatively, all of the cache may be external to the core and/or the processor.

Figure 6B:
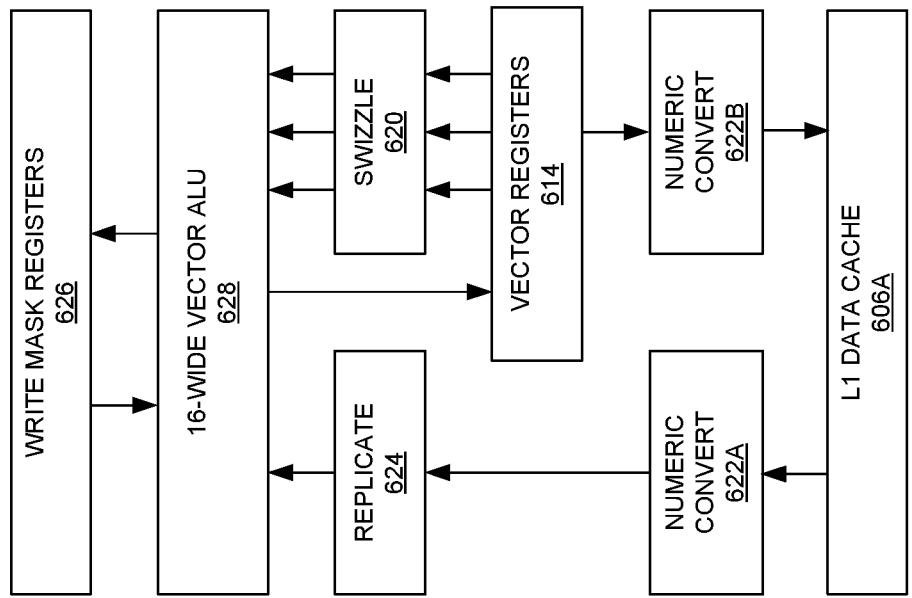
FIGS. 6A and 6B illustrate block diagrams of a more specific exemplary in-order core architecture, which core would be one of several logic blocks (including other cores of the same type and/or different types) in a chip.
Figure 6A:
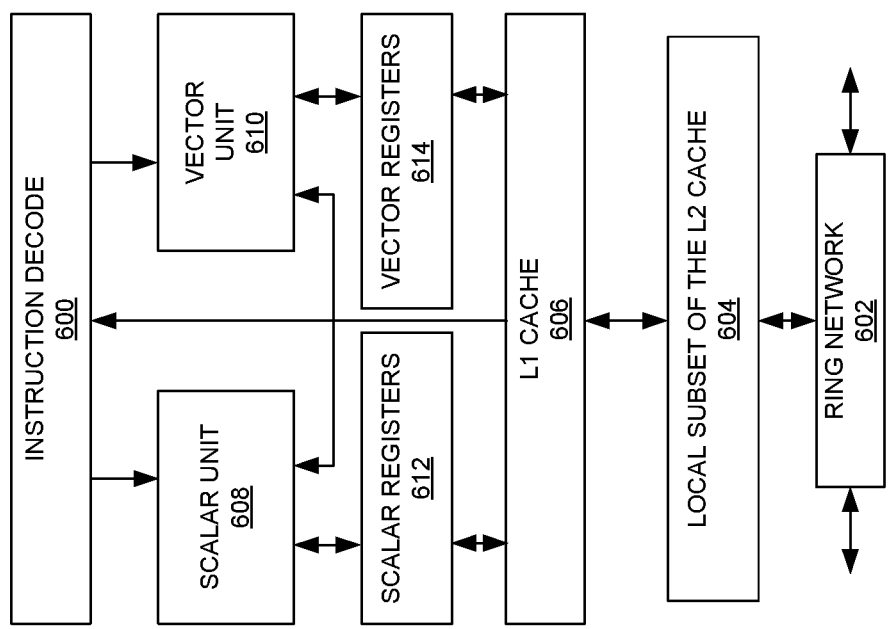

FIGS. 6A and 6B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 6A is a block diagram of a single processor core, along with its connection to the on-die interconnect network 602 and with its local subset of the Level 2 (L2) cache 604, according to embodiments of the invention. In one embodiment, an instruction decoder 600 supports the x86 instruction set with a packed data instruction set extension. An L1 cache 606 allows low-latency accesses to cache memory into the scalar and vector units. While in one embodiment (to simplify the design), a scalar unit 608 and a vector unit 610 use separate register sets (respectively, scalar registers 612 and vector registers 614) and data transferred between them is written to memory and then read back in from a level 1 (L1) cache 606, alternative embodiments of the invention may use a different approach (e.g., use a single register set or include a communication path that allow data to be transferred between the two register files without being written and read back). Understand that the illustrated caches may perform silent store suppression as described herein.

The local subset of the L2 cache 604 is part of a global L2 cache that is divided into separate local subsets, one per processor core. Each processor core has a direct access path to its own local subset of the L2 cache 604. Data read by a processor core is stored in its L2 cache subset 604 and can be accessed quickly, in parallel with other processor cores accessing their own local L2 cache subsets. Data written by a processor core is stored in its own L2 cache subset 604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 6B is an expanded view of part of the processor core in FIG. 6A according to embodiments of the invention. FIG. 6B includes an L1 data cache 606A part of the L1 cache 604, as well as more detail regarding the vector unit 610 and the vector registers 614. Specifically, the vector unit 610 is a 16-wide vector processing unit (VPU) (see the 16-wide ALU 628), which executes one or more of integer, single-precision float, and double-precision float instructions. The VPU supports swizzling the register inputs with swizzle unit 620, numeric conversion with numeric convert units 622A-B, and replication with replication unit 624 on the memory input. Write mask registers 626 allow predicating resulting vector writes.

Figure 7:
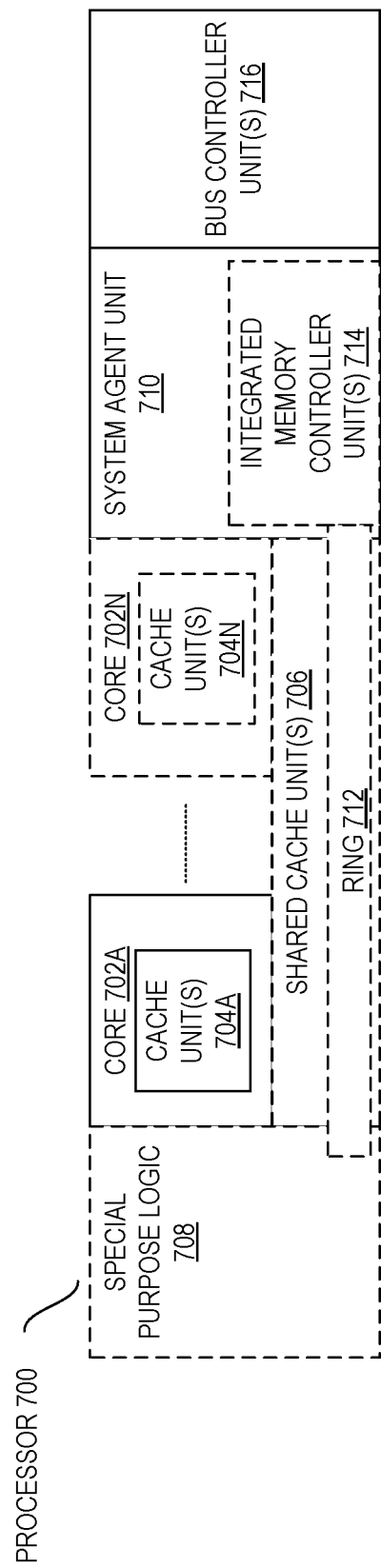
FIG. 7 is a block diagram of a processor that may have more than one core, may have an integrated memory controller, and may have integrated graphics according to embodiments of the invention.

FIG. 7 is a block diagram of a processor 700 that may have more than one core, may have an integrated memory controller, and may have integrated graphics according to embodiments of the invention. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC)

coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache units 704A-N within the cores, any of which may perform silent store suppression as described herein, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the special purpose logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702-A-N.

In some embodiments, one or more of the cores 702A-N are capable of multithreading. The system agent unit 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

FIGS. 8-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
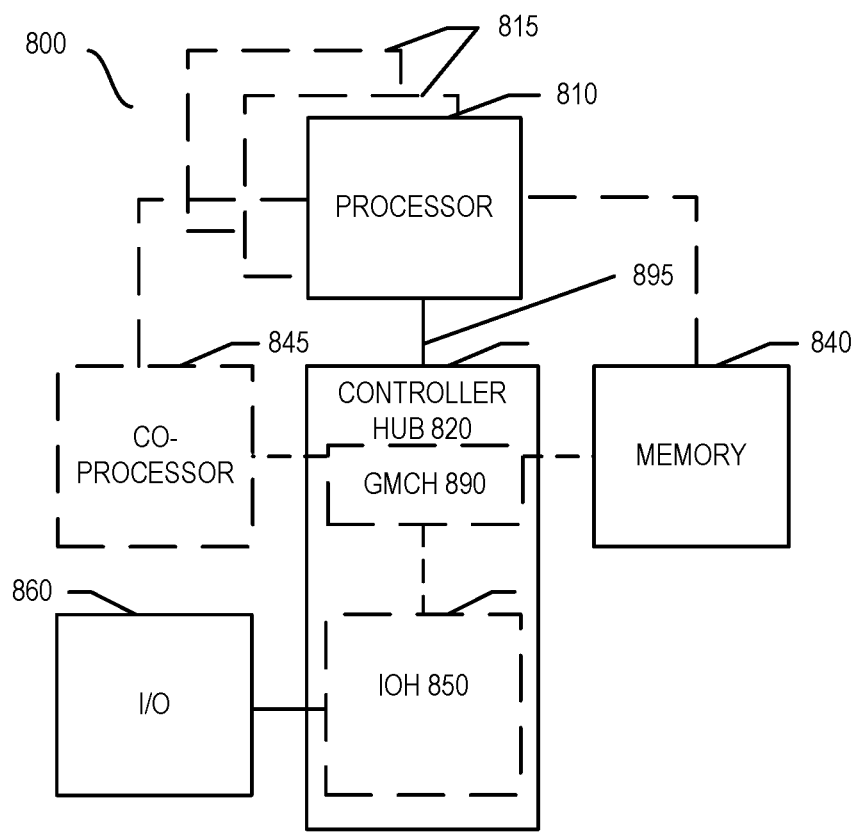
FIG. 8 is a block diagram of a system in accordance with one embodiment of the present invention.

Referring now to FIG. 8, shown is a block diagram of a system 800 in accordance with one embodiment of the present invention. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes a memory controller and a graphics controller to which are coupled memory 840 and a coprocessor 845; the IOH 850 couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 800.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
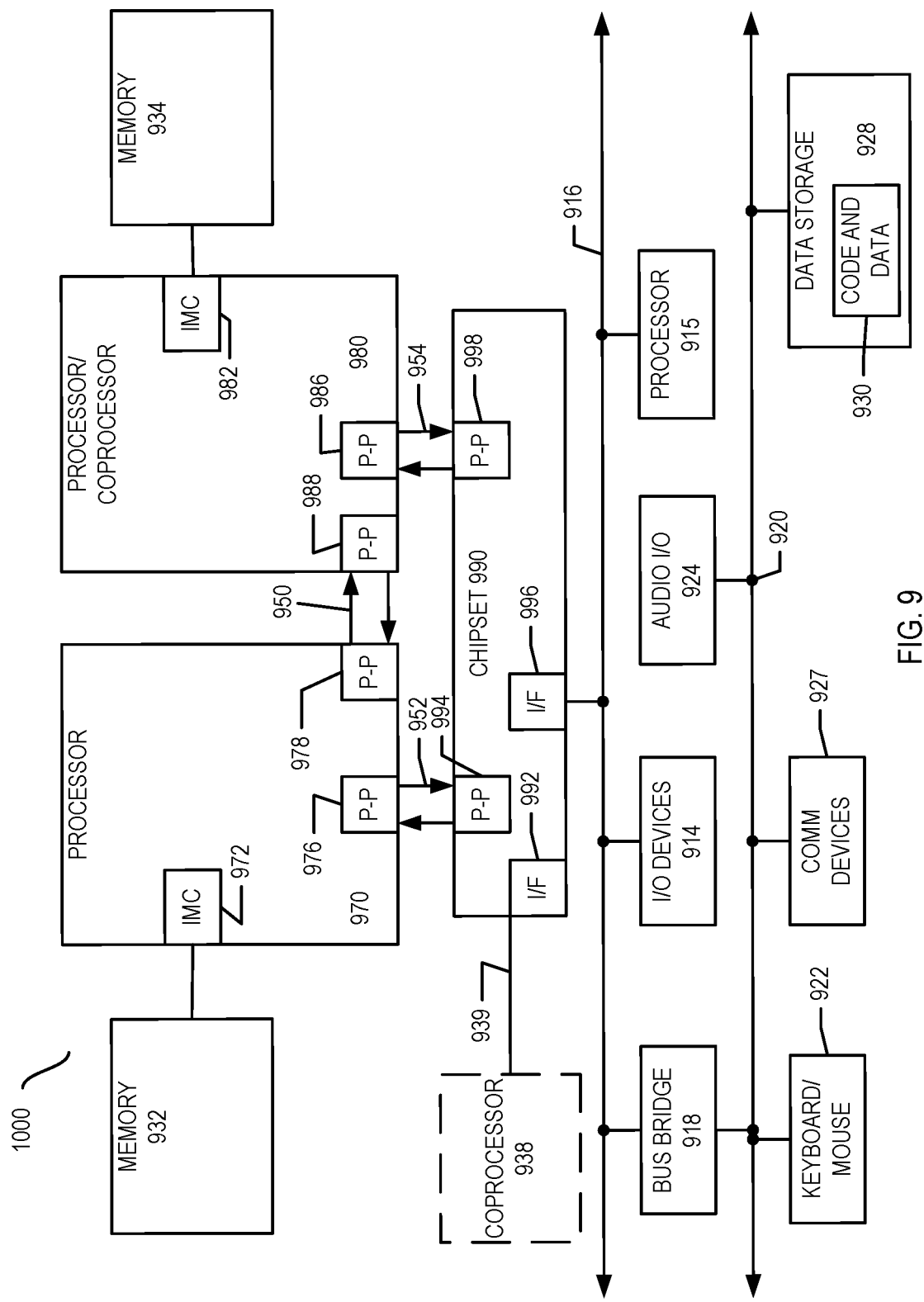
FIG. 9 is a block diagram of a first more specific exemplary system in accordance with an embodiment of the present invention.

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the invention, processors 970 and 980 are respectively processors 810 and 815, while coprocessor 938 is coprocessor 845. In another embodiment, processors 970 and 980 are respectively processor 810 and coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934 which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode. Such cache also may perform silent store suppression as described herein.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
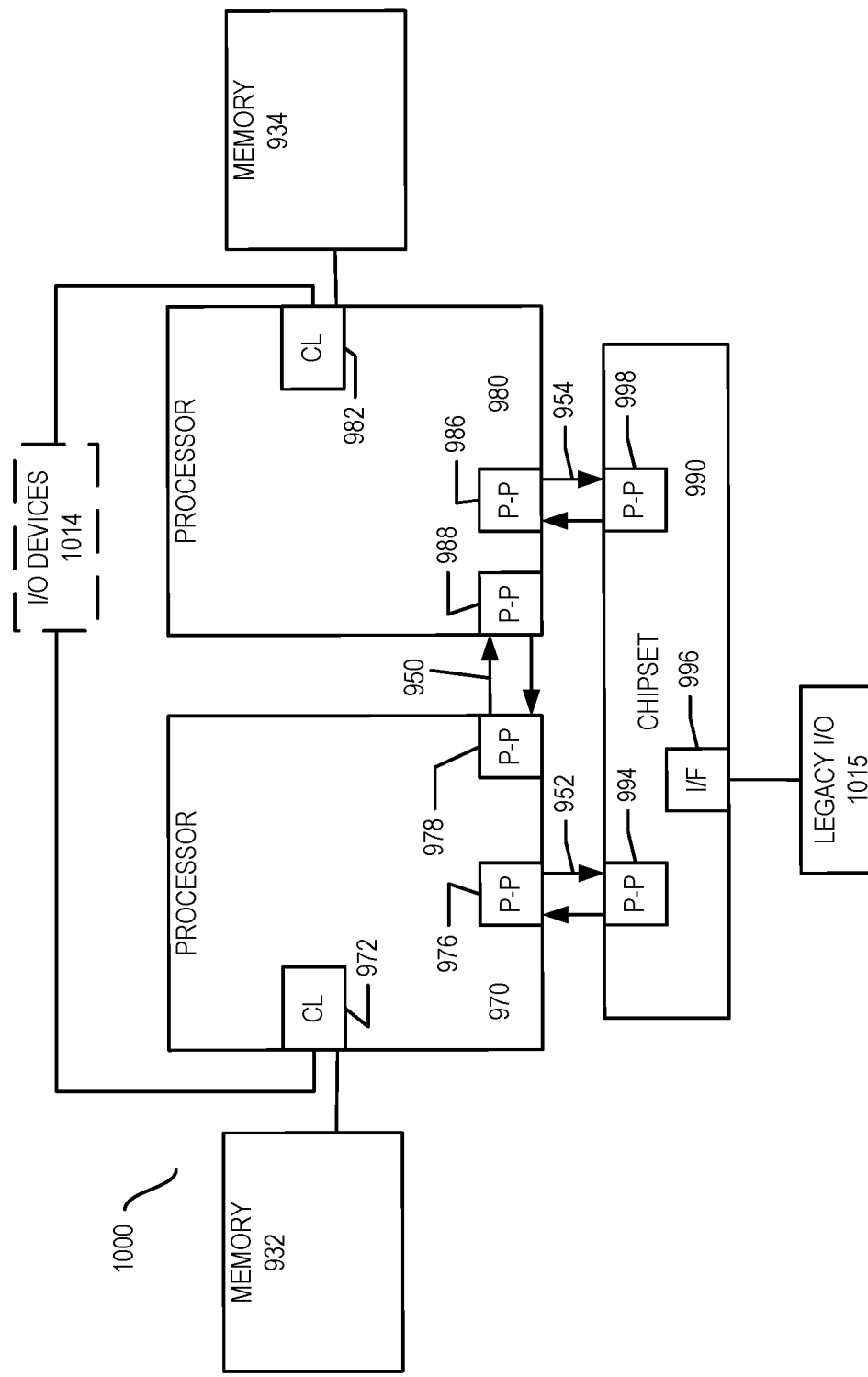
FIG. 10 is a block diagram of a second more specific exemplary system in accordance with an embodiment of the present invention.

Referring now to FIG. 10, shown is a block diagram of a second more specific exemplary system 1000 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 972 and 982, respectively. Thus, the CL 972, 982 include integrated memory controller units and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
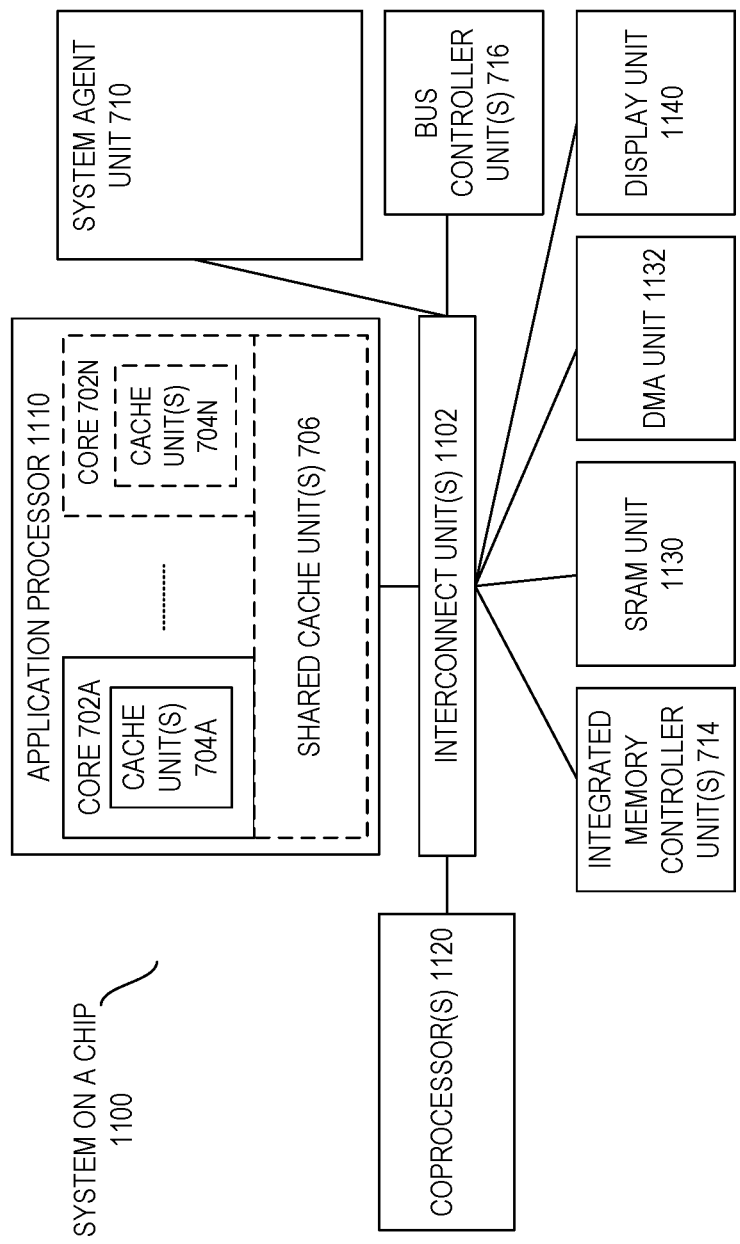
FIG. 11 is a block diagram of a SoC in accordance with an embodiment of the present invention.

Referring now to FIG. 11, shown is a block diagram of a SoC 1100 in accordance with an embodiment of the present invention. Similar elements in FIG. 7 bear like reference numerals. Also, dashed lined boxes are optional features on more advanced SoCs. In FIG. 11, an interconnect unit(s) 1102 is coupled to: an application processor 1110 which includes a set of one or more cores 702 A-N and shared cache unit(s) 706; a system agent unit 710; a bus controller unit(s) 716; an integrated memory controller unit(s) 714; a set or one or more coprocessors 1120 which may include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Figure 12:
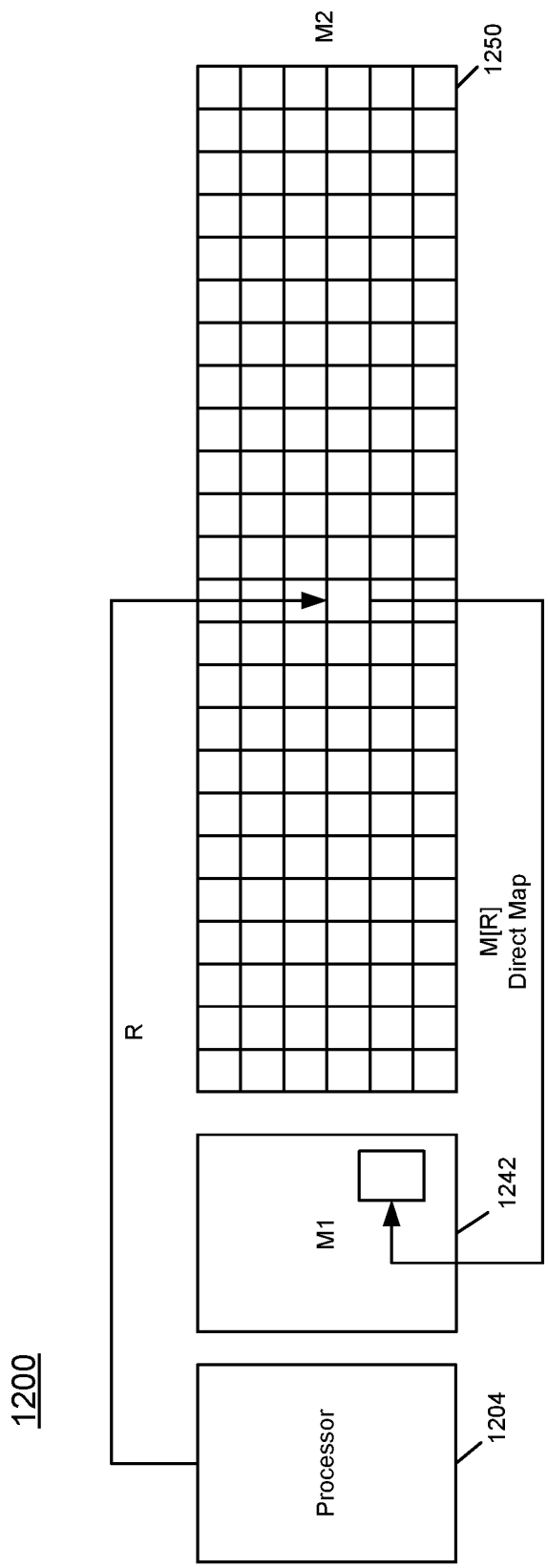
FIG. 12 is a block diagram of a system in accordance with an embodiment.

Referring now to FIG. 12, shown is a block diagram of a system in accordance with an embodiment. As shown in FIG. 12, system 1200 is illustrated at a high level as having a two-level memory (2LM) hierarchy in which a processor 1204 (e.g., a multicore processor or other SoC) is coupled to a first memory tier 1242, and a second, more capacious but slower system memory tier, 1250. In various embodiments the capacious memory 1250 may be a byte-addressable and directly addressable large capacity (e.g., multiple terabytes) memory tier created out of denser storage class memory technologies using phase change materials, memristors, or alternative memory technologies. In different embodiments persistent storage media may include (but is not limited to) one or more NVDIMM solutions that materialize persistent memory, such as NVDIMM-F, NVDIMM-N, resistive random access memory, Intel® 3DXPoint™-based memory, and/or other solutions. In a two-level mode of operation, the multiple terabytes of memory 1250 can be hardware-cached by system memory 1242 (e.g., DRAM) that is roughly an order of magnitude smaller in comparison, transparent to software. Such transparent caching enables applications to realize the higher capacity of this memory, but shields them from longer and non-uniform memory latencies presented by the capacious memory 1250. For brevity, "M2" is used herein to refer to the capacious memory 1250, and "M1" is used to refer to buffering memory 1242, which may be invisible or transparent to software but is used by hardware as a cache for M2. In various embodiments, silent store suppressions as described herein may be performed within processor 1204 to limit the number of write operations destined to memory 1250, reducing memory traffic and wear on the non-volatile memory.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
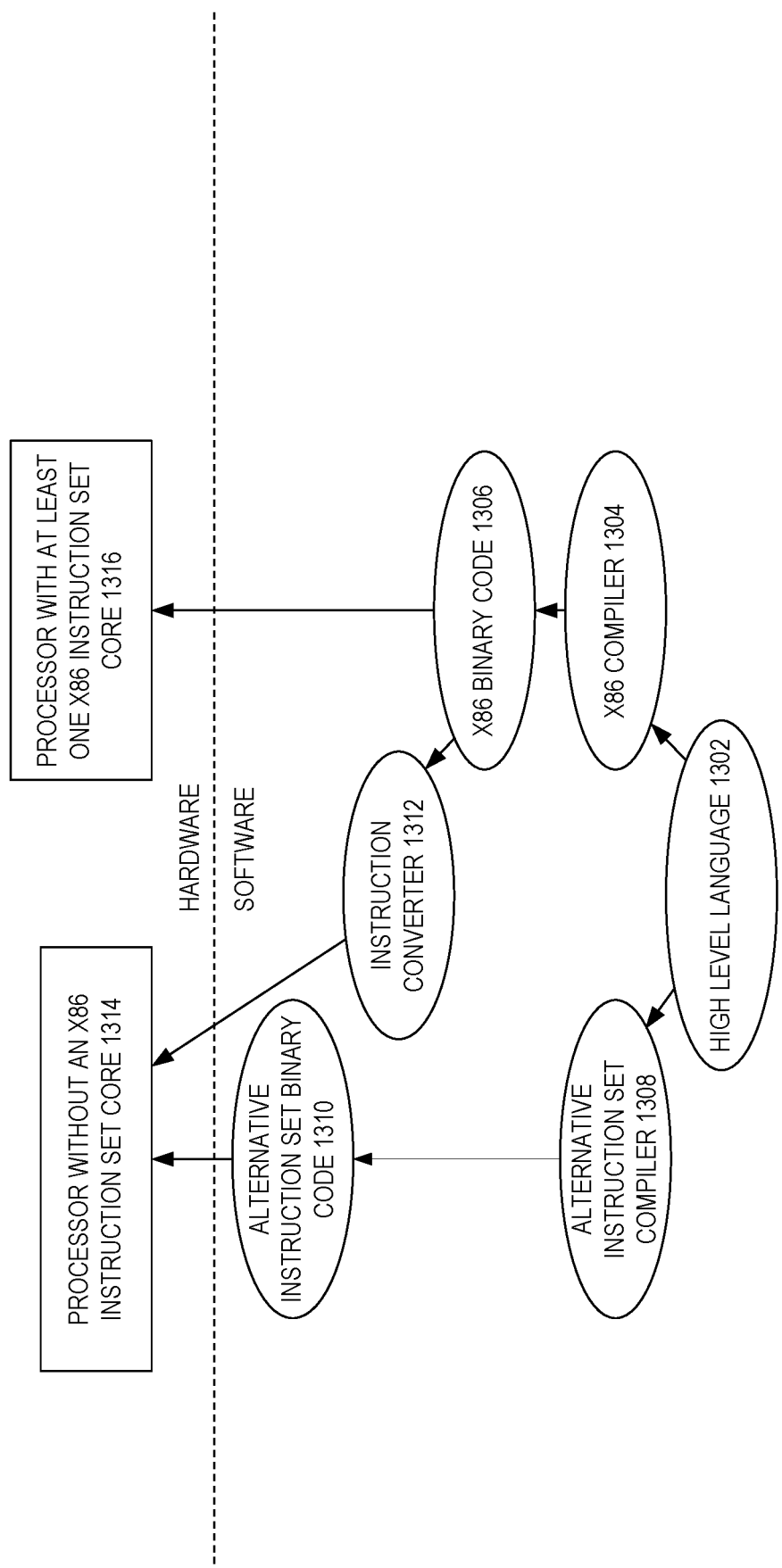
FIG. 13 is a block diagram contrasting the use of a software instruction converter to convert binary instructions in a source instruction set to binary instructions in a target instruction set according to embodiments of the invention

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

The following examples pertain to further embodiments.

In one example, a processor comprises a core including at least one execution circuit, a retirement circuit, a first cache memory, and a first cache controller to control the first cache memory, where the first cache controller, in response to a store request to store a first value to a memory coupled to the processor, is to suppress the store operation when the first value matches a stored value of a cache line associated with the store operation.

In an example, to suppress the store operation, the first cache controller is to ignore the first value and maintain the stored value of the cache line and maintain a current coherency state of the cache line.

In an example, the retirement circuit is to retire the store operation in response to the suppression of the store operation.

In an example, the first cache controller is to send the stored value to the execution circuit and the execution circuit is to compare the stored value with the first value and send a result of the comparison to the first cache controller.

In an example, the first cache controller is to suppress the store operation based on the result.

In an example, the first cache controller is to prevent the store operation suppression if the processor is in a transactional memory mode.

In an example, the first cache controller is to prevent the store operation suppression if the cache line is in a modified state.

In an example, if the cache line associated with the store operation is not present in the first cache memory, the first cache controller is to store the first value into the first cache memory and not suppress the store operation.

In an example, the first cache controller is to suppress the store operation in response to a determination that the memory is a non-volatile memory, and not suppress the store operation in response to a determination that the memory is a volatile memory.

In an example, the processor further comprises a system address decoder to determine and indicate to the first cache controller whether an address associated with the store request is in the non-volatile memory or the non-volatile memory.

In an example, the processor further comprises a performance monitor to monitor a count of a number of suppressed store operations for an application.

In an example, the processor is to handle the store operation as a no operation to suppress the store operation.

In another example, a method comprises: receiving, in a cache controller of a processor, a store request to store a first value to a memory coupled to the processor; causing, by the cache controller, an execution unit of a core of the processor to compare the first value to a stored value of a cache line of a cache memory associated with the store request; and in response to determining that the first value matches the stored value, suppressing the first value from being stored into the cache memory.

In an example, the method further comprises: determining, based at least in part on an address of the store request, whether the memory is a non-volatile memory; suppressing the first value from being stored into the cache memory, in response to determining that the memory is the non-volatile memory; and in response to determining that the memory is a volatile memory, storing the first value into the cache memory.

In an example, suppressing the first value from being stored into the cache memory further comprises maintaining the stored value in the cache line and maintaining a current cache coherency state of the cache line.

In an example, suppressing the first value from being stored into the cache memory further comprises retiring the store request without sending the cache line to the memory.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system includes a processor comprising: a core including at least one execution circuit, a first cache memory, and a first cache controller to control the first cache memory, where the first cache controller is to suppress a first store request to a non-volatile memory when a first value of the store request corresponds to a stored value in the first cache memory, the stored value associated with the store request; and a memory controller coupled to the core. The system may further include the non-volatile memory coupled to the processor, the non-volatile memory organized at a block level, the first cache memory organized at a cache line level, where the suppression of the store operation is to reduce memory traffic between the processor and the non-volatile memory and reduce wear leveling within the non-volatile memory.

In an example, to suppress the store operation, the first cache controller is to ignore the first value and maintain the stored value stored in a first cache line of the first cache memory and further to maintain a current coherency state of the first cache line.

In an example, the system further comprises a volatile memory coupled to the processor, where the first cache controller is to fulfill a second store request to the volatile memory, without a determination of whether a second value of the second store request corresponds to a second stored value in the first cache memory, the second stored value associated with the second store request.

In an example, the processor further comprises a retirement circuit to retire the first store request in response to the first store request suppression.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a core including at least one execution circuit, a retirement circuit, a first cache memory, and a first cache controller to control the first cache memory, wherein the first cache controller, in response to a store request to store a first value to a memory coupled to the processor, is to suppress a store operation when the first value matches a stored value of a cache line associated with the store operation.

2. The processor of claim 1, wherein, to suppress the store operation, the first cache controller is to ignore the first value and maintain the stored value of the cache line and maintain a current coherency state of the cache line.

3. The processor of claim 1, wherein the retirement circuit is to retire the store operation in response to the suppression of the store operation.

4. The processor of claim 1, wherein the first cache controller is to send the stored value to the execution circuit and the execution circuit is to compare the stored value with the first value and send a result of the comparison to the first cache controller.

5. The processor of claim 4, wherein the first cache controller is to suppress the store operation based on the result.

6. The processor of claim 1, wherein the first cache controller is to prevent the store operation suppression if the processor is in a transactional memory mode.

7. The processor of claim 1, wherein the first cache controller is to prevent the store operation suppression if the cache line is in a modified state.

8. The processor of claim 1, wherein if the cache line associated with the store operation is not present in the first cache memory, the first cache controller is to store the first value into the first cache memory and not suppress the store operation.

9. The processor of claim 1, wherein the first cache controller is to suppress the store operation in response to a determination that the memory is a non-volatile memory, and not suppress the store operation in response to a determination that the memory is a volatile memory.

10. The processor of claim 9, wherein the processor further comprises a system address decoder to determine and indicate to the first cache controller whether an address associated with the store request is in the non-volatile memory or the non-volatile memory.

11. The processor of claim 1, wherein the processor further comprises a performance monitor to monitor a count of a number of suppressed store operations for an application.

12. The processor of claim 1, wherein the processor is to handle the store operation as a no operation to suppress the store operation.

13. At least one computer readable storage medium having stored thereon instructions, which if performed by a machine cause the machine to perform a method comprising:
   receiving, in a cache controller of a processor, a store request to store a first value to a memory coupled to the processor;
   causing, by the cache controller, an execution unit of a core of the processor to compare the first value to a stored value of a cache line of a cache memory associated with the store request; and
   in response to determining that the first value matches the stored value, suppressing the first value from being stored into the cache memory.

14. The at least one computer readable storage medium of claim 13, wherein the method further comprises:
   determining, based at least in part on an address of the store request, whether the memory is a non-volatile memory;
   suppressing the first value from being stored into the cache memory, in response to determining that the memory is the non-volatile memory; and
   in response to determining that the memory is a volatile memory, storing the first value into the cache memory.

15. The at least one computer readable storage medium of claim 13, wherein suppressing the first value from being stored into the cache memory further comprises maintaining the stored value in the cache line and maintaining a current cache coherency state of the cache line.

16. The at least one computer readable storage medium of claim 13, wherein suppressing the first value from being stored into the cache memory further comprises retiring the store request without sending the cache line to the memory.

17. A system comprising:
   a processor comprising:
      a core including at least one execution circuit, a first cache memory, and a first cache controller to control the first cache memory, wherein the first cache controller is to suppress a first store request to a non-volatile memory when a first value of the store request corresponds to a stored value in the first cache memory, the stored value associated with the store request; and
      a memory controller coupled to the core; and
   the non-volatile memory coupled to the processor, the non-volatile memory organized at a block level, the first cache memory organized at a cache line level, wherein the suppression of a store operation is to reduce memory traffic between the processor and the non-volatile memory and reduce wear leveling within the non-volatile memory.

18. The system of claim 17, wherein, to suppress the store operation, the first cache controller is to ignore the first value and maintain the stored value stored in a first cache line of the first cache memory and further to maintain a current coherency state of the first cache line.

19. The system of claim 17, further comprising a volatile memory coupled to the processor, wherein the first cache controller is to fulfill a second store request to the volatile memory, without a determination of whether a second value of the second store request corresponds to a second stored value in the first cache memory, the second stored value associated with the second store request.

20. The system of claim 17, wherein the processor further comprises a retirement circuit to retire the first store request in response to the first store request suppression.

* * * * *